(12) United States Patent
Watanabe et al.

(10) Patent No.: US 9,055,615 B2
(45) Date of Patent: Jun. 9, 2015

(54) INDUCTION HEATING COOKER (75) Inventors: Kenji Watanabe, Hyogo (JP); Takahiro Miyauchi, Hyogo (JP); Tomoya Fujinami, Shiga (JP); Hiroshi Tominaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 785 days.

(21) Appl. No.: 13/142,205

(22) PCT Filed: Nov. 30, 2009

(86) PCT No.: PCT/JP2009/006475
§ 371 (c)(1),
(2), (4) Date: Jun. 24, 2011

(87) PCT Pub. No.: WO2010/073490
PCT Pub. Date: Jul. 1, 2010

(65) Prior Publication Data
US 2011/0259877 A1   Oct. 27, 2011

(30) Foreign Application Priority Data

Dec. 26, 2008   (JP) .................. 2008-332564
Jun. 23, 2009   (JP) .................. 2009-148603

(51) Int. Cl.
*B23K 1/002*   (2006.01)
*B23K 1/015*   (2006.01)
(Continued)

(52) U.S. Cl.
CPC .............. *H05B 6/062* (2013.01); *B23K 26/345* (2013.01); *B23K 9/173* (2013.01); *H05B 2213/07* (2013.01)

(58) Field of Classification Search
CPC ...... B23K 26/345; B23K 9/173; B22F 3/1055
USPC ................................ 219/621, 624, 660, 622
See application file for complete search history.

(56) References Cited

U.S. PATENT DOCUMENTS 8,378,274 B2   2/2013   Fujinami et al.
2003/0025090 A1   2/2003   Iwasaki
(Continued)

FOREIGN PATENT DOCUMENTS

CA   2 672 788 A1   6/2008
EP   1 978 785 A1   10/2008
(Continued)

OTHER PUBLICATIONS

International Preliminary Report on Patentability for International Application No. PCT/JP2009/006475, dated Aug. 16, 2011, 8 pages.
(Continued)

*Primary Examiner* — Tu B Hoang
*Assistant Examiner* — Thomas Ward
(74) *Attorney, Agent, or Firm* — Brinks Gilson & Lione (57) ABSTRACT

The present invention provides an induction heating cooker, which is structured to cut off visible light being incident upon an infrared sensor, yet being capable of more accurately sensing any abnormality of the infrared sensor before heating is started. To this end, the induction heating cooker includes a sensor failure sensing-purpose light emitting portion that emits visible light for sensing any failure of an infrared sensor, a visible light cutting filter provided on a surface of a printed circuit board holding the infrared sensor so as to cover the field of view of the infrared sensor, and a control unit that limits the output of an inverter circuit supplying a high-frequency current to a heating coil when the output of the infrared sensor is equal to or less than a threshold value in a situation where the sensor failure sensing-purpose light emitting portion is lit up. The infrared sensor receives the visible light from the sensor failure sensing-purpose light emitting portion to irradiate inside the visible light cutting filter.

4 Claims, 6 Drawing Sheets (51) Int. Cl.
 *B23K 3/00* (2006.01)
 *H05B 6/06* (2006.01)
 *B23K 26/34* (2014.01)
 *B23K 9/173* (2006.01)

(56) References Cited

U.S. PATENT DOCUMENTS

| 2009/0152260 A1 | 6/2009 | Fujinami et al. | |
|---|---|---|---|
| 2010/0102054 A1 | 4/2010 | Fujinami et al. | |
| 2010/0181299 A1* | 7/2010 | Niiyama et al. | 219/620 |
| 2010/0206871 A1* | 8/2010 | Kataoka et al. | 219/622 |

FOREIGN PATENT DOCUMENTS

| EP | 2104399 A1 | 9/2009 |  |  |  |
|---|---|---|---|---|---|
| EP | 2117282 A1 | 11/2009 |  |  |  |
| JP | 63-204188 A | 8/1988 |  |  |  |
| JP | 04-074393 U | 6/1992 |  |  |  |
| JP | 2001-074853 A | 3/2001 |  |  |  |
| JP | 2003040491 A | * | 2/2003 | ............... | B65H 7/14 |
| JP | 2007-213894 A | 8/2007 |  |  |  |
| JP | 2007-299707 A | 11/2007 |  |  |  |
| JP | 2008-176937 A | 7/2008 |  |  |  |
| WO | WO 2008/084829 A1 | 7/2008 |  |  |  |

OTHER PUBLICATIONS

International Search Report for International Application No. PCT/JP2009/006475, dated Mar. 2, 2010, 2 pages.

Extended European Search Report, dated Jun. 26, 2014, pp. 1-5, issued in European Patent Application No. 09834306.4, European Patent Office, Munich, Germany.

* cited by examiner

INDUCTION HEATING COOKER

This application is a 371 application of PCT/JP2009/006475 having an international filing date of Nov. 30, 2009, which claims priority to JP2008-332564 filed on Dec. 26, 2008 and JP2009-148603 filed on Jun. 23, 2009, the entire contents of which are incorporated herein by reference.

TECHNICAL FIELD

The present invention relates to an induction heating cooker including an infrared sensor. More specifically, the present invention relates to an induction heating cooker with which abnormality of an infrared sensor can be sensed before heating is carried out.

BACKGROUND ART

In recent years, an induction heating cooker which inductively heats a cooking vessel with a heating coil has been appreciated at its excellent characteristics in terms of safety, cleanliness, and high efficiency, and has been in widespread use. An example of such an induction heating cooker is disclosed in Patent Document 1 (Japanese Unexamined Patent Publication No. 2007-299707).

Figure 10:
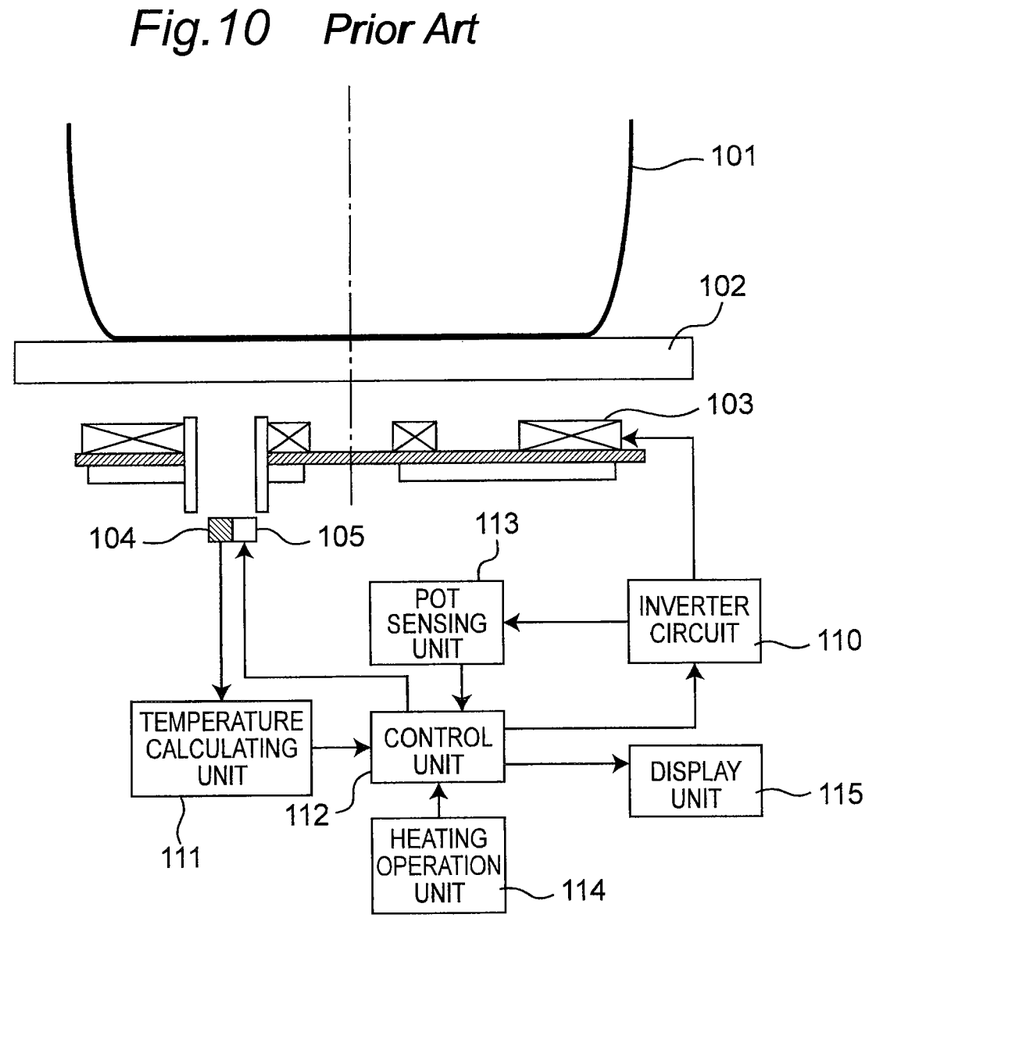
FIG. 10 is a schematic configuration diagram of a conventional induction heating cooker.

FIG. 10 is a diagram showing the schematic structure of the conventional induction heating cooker disclosed in Patent Document 1. As shown in FIG. 10, the conventional induction heating cooker includes a top plate 102 on which a cooking vessel 101 being a heating-target object is placed, a heating coil 103 which inductively heats the cooking vessel 101, and an inverter circuit 110 which supplies a high-frequency current to a heating coil 103. Below the heating coil 103, there are disposed an infrared sensor 104 which senses infrared radiation radiated from the cooking vessel 101, and a light emitting portion 105 which is disposed near the infrared sensor 104 to emit light toward the top plate 102.

An output of the infrared sensor 104 is provided to a temperature calculating unit 111. The temperature calculating unit 111 calculates a temperature of the cooking vessel 101 based on such an output signal from the infrared sensor 104. The temperature of the cooking vessel 101 calculated by the temperature calculating unit 111 is provided to a control unit 112. The control unit 112 controls an inverter circuit 110 based on temperature information obtained from the temperature calculating unit 111, to control supply of the high-frequency current to the heating coil 103. The conventional induction heating cooker further includes a pot sensing unit 113 that senses the cooking vessel 101 being placed on the top plate 102 based on an output signal from the inverter circuit 110, a heating operation unit 114 for the user to carry out heating operations with the cooker, and a display unit 115 that displays the operating state of the device.

With the conventional induction heating cooker structured as described above, because the light emitting portion 105 is provided near the infrared sensor 104, the position of the infrared sensor 104 can be reported to the user by allowing the light emitting portion 105 to light up. This makes it possible to guide the user to correctly place the cooking vessel 101 on a region of the top plate 102 above the infrared sensor 104. Further, the output of the infrared sensor 104 changes by the light emitted from the light emitting portion 105 being incident on the infrared sensor 104. Therefore, by sensing whether or not the output of the infrared sensor 104 is equal to or less than a threshold value when the light emitting portion 105 is lit up, it is possible to determine an abnormality (failure) of the infrared sensor 104 before heating the cooking vessel 101. Based on that, the output of the inverter circuit 110 is limited, such that an excessive increase in the temperature of the cooking vessel 101 due to abnormality of the infrared sensor 104 can be avoided.

Patent Document 1: Japanese Unexamined Patent Publication No. 2007-299707

SUMMARY OF THE INVENTION

Problems to be Solved by the Invention

However, with the conventional induction heating cooker, because the position of the infrared sensor 104 is reported by the light emitting portion 105 being lit up, the light from the light emitting portion 105 naturally includes visible light. The output of the infrared sensor 104 changes also by such visible light being incident thereupon. Accordingly, for example, in a situation where the induction heating cooker is used in a high luminance environment where it is exposed to ambient light which includes visible light such as sunlight, the ambient light may affect the output of the infrared sensor 104. Provided that the cooking vessel 101 is placed on the top plate 102 to cover the infrared sensor 104 from above, because the ambient light propagates through the top plate 102, the ambient light cannot fully be prevented from reaching the infrared sensor 104.

A possible way to prevent the ambient light from being incident upon the infrared sensor 104 is to provide a visible light cutting filter around the infrared sensor 104 for cutting off visible light. However, in this case, this filter cuts off the visible light from the light emitting portion 105 also. Therefore, an amount of light reaching the infrared sensor 104 reduces. Hence, the abnormality of the infrared sensor 104 may not accurately be sensed before heating is started.

Accordingly, an object of the present invention is to solve the problems stated above, and to provide an induction heating cooker, which is structured to cut off visible light being incident upon an infrared sensor, yet being capable of more accurately sensing any abnormality of the infrared sensor before heating is started, without an increase in the visible light emission amount of the light emitting portion, while preventing the light of the light emitting portion from being visually recognized by a user.

Means for Solving the Problems

In order to achieve the object described above, the present invention is structured as follows.

According to a first aspect of the present invention, there is provided an induction heating cooker, comprising: a heating coil that heats a heating-target object on a top plate; an inverter circuit that supplies a high-frequency current to the heating coil; an infrared sensor that is provided below the top plate and that senses infrared radiation radiated from the heating-target object; a sensor failure sensing-purpose light emitting portion that emits visible light for sensing a failure of the infrared sensor; a control unit that controls a driving operation of the inverter circuit in accordance with an output of the infrared sensor and limits an output of the inverter circuit when the output of the infrared sensor is equal to or less than a threshold value in a situation where the sensor failure sensing-purpose light emitting portion is lit up; a printed circuit board that holds the infrared sensor; and a visible light cutting filter that is provided on a surface of the printed circuit board where the infrared sensor is held, so as to cover a field of view of the infrared sensor, the visible light cutting filter storing therein the infrared sensor to allow transmission of the infrared radiation externally incident upon the infrared sensor and to cut off visible light externally incident upon the infrared sensor, wherein the infrared sensor receives the visible light emitted from the sensor failure sensing-purpose light emitting portion to irradiate inside the visible light cutting filter.

According to a second aspect of the present invention, there is provided the induction heating cooker as defined in the first aspect, wherein the visible light cutting filter is provided with a thin film that allows transmission of the infrared radiation, that reinforces a visible light cutting characteristic of the visible light cutting filter, and that reflects off the visible light from the sensor failure sensing-purpose light emitting portion radiated inside the visible light cutting filter.

According to a third aspect of the present invention, there is provided the induction heating cooker as defined in any one of the first aspect and second aspect, wherein the printed circuit board is structured with a light transmissive member, and the sensor failure sensing-purpose light emitting portion is provided on a surface of the printed circuit board opposite to the surface where the infrared sensor is held, and the sensor failure sensing-purpose light emitting portion irradiates inside the visible light cutting filter with the visible light transmitting through the printed circuit board.

According to a fourth aspect of the present invention, there is provided the induction heating cooker as defined in the third aspect, wherein the sensor failure sensing-purpose light emitting portion emits the visible light from a surface perpendicular to the surface of the printed circuit board where the infrared sensor is held.

According to a fifth aspect of the present invention, there is provided the induction heating cooker as defined in any one of the third aspect and fourth aspect, wherein the printed circuit board is made of glass epoxy.

According to a sixth aspect of the present invention, there is provided the induction heating cooker as defined in any one of the first aspect and second aspect, wherein the printed circuit board is provided with an opening portion near a disposition portion of the infrared sensor, and the sensor failure sensing-purpose light emitting portion is provided on a surface of the printed circuit board opposite to the surface where the infrared sensor is held, and the sensor failure sensing-purpose light emitting portion irradiates inside the visible light cutting filter with the visible light through the opening portion.

According to a seventh aspect of the present invention, there is provided the induction heating cooker as defined in any one of the first aspect and second aspect, wherein the sensor failure sensing-purpose light emitting portion is provided in a region on the surface of the printed circuit board where the infrared sensor covered by the visible light cutting filter is held.

According to an eighth aspect of the present invention, there is provided the induction heating cooker as defined in the third aspect, wherein on a part of the surface of the printed circuit board, a conductive foil and a colored resist film for avoiding adhesion of solder to the conductive foil are formed, and the sensor failure sensing-purpose light emitting portion irradiates with the visible light a light transmissive portion from which the resist film and the conductive foil are both removed.

According to a ninth aspect of the present invention, there is provided the induction heating cooker as defined in the eighth aspect, wherein the light transmissive portion that the sensor failure sensing-purpose light emitting portion irradiates with the visible light is formed near the infrared sensor.

According to a tenth aspect of the present invention, there is provided the induction heating cooker as defined in the first aspect, wherein a sensor position reporting-purpose light emitting portion that emits visible light to irradiate a region on the top plate sensed by the infrared sensor or a region nearby is provided near the infrared sensor.

According to an eleventh aspect of the present invention, there is provided the induction heating cooker as defined in the second aspect, wherein the visible light cutting filter includes a lens that is formed with a resin and that has a filter characteristic of allowing transmission of the infrared radiation and of cutting off visible light, and a glass substrate that is disposed inside the lens and that is provided with a metal thin film or a dielectric thin film allowing transmission of the infrared radiation and cutting off visible light.

Effects of the Invention

With the induction heating cooker of the present invention, even in a situation where the induction heating cooker is used in a high luminance environment where the induction heating cooker is exposed to ambient light which includes visible light such as sunlight, the visible light cutting filter makes it possible to suppress any change in the output of the infrared sensor due to the ambient light. Further, because the visible light emitted from the sensor failure sensing-purpose light emitting portion reflects inside the visible light cutting filter to be incident upon the infrared sensor without being cut off by the visible light cutting filter, it is possible to detect any abnormality of the infrared sensor without an increase in the emission light amount of the sensor failure sensing-purpose light emitting portion. The sensor failure sensing-purpose light emitting portion is structured to emit visible light. Therefore, it can be manufactured at lower cost as compared to those emitting infrared radiation. Further, the light that the sensor failure sensing-purpose light emitting portion emits when the sensor failure sensing-purpose light emitting portion senses failure is cut off by the visible light cutting filter, so as not to be visually recognized by a user. Thus, the user will not be bothered by a feeling of strangeness.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is noted that like parts are designated by like reference numerals throughout the accompanying drawings.

In the following, embodiments of the present invention will be described with reference to the drawings.

First Embodiment

Figure 1:
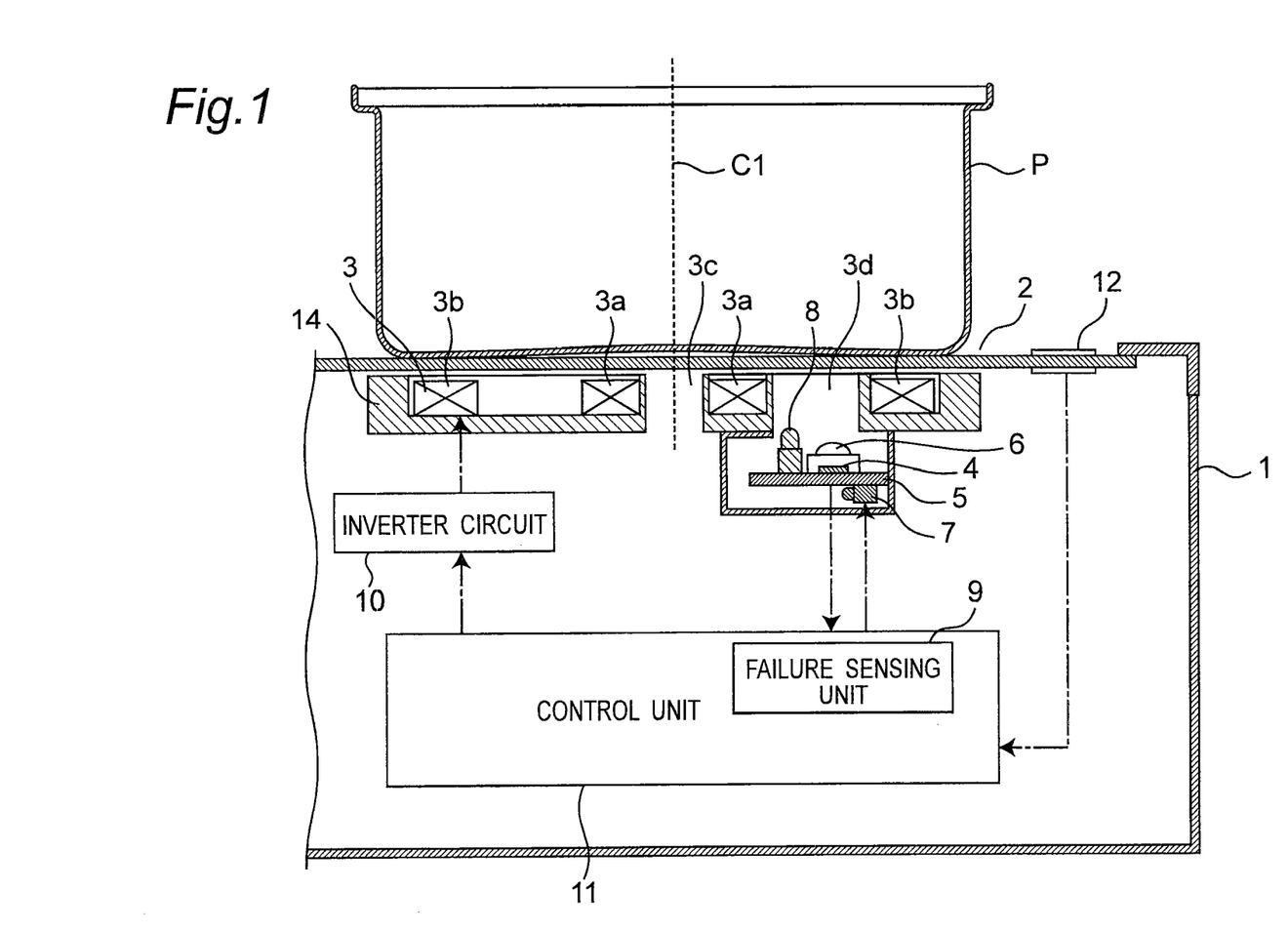
FIG. 1 is a schematic configuration diagram showing an induction heating cooker according to a first embodiment of the present invention.
Figure 2:
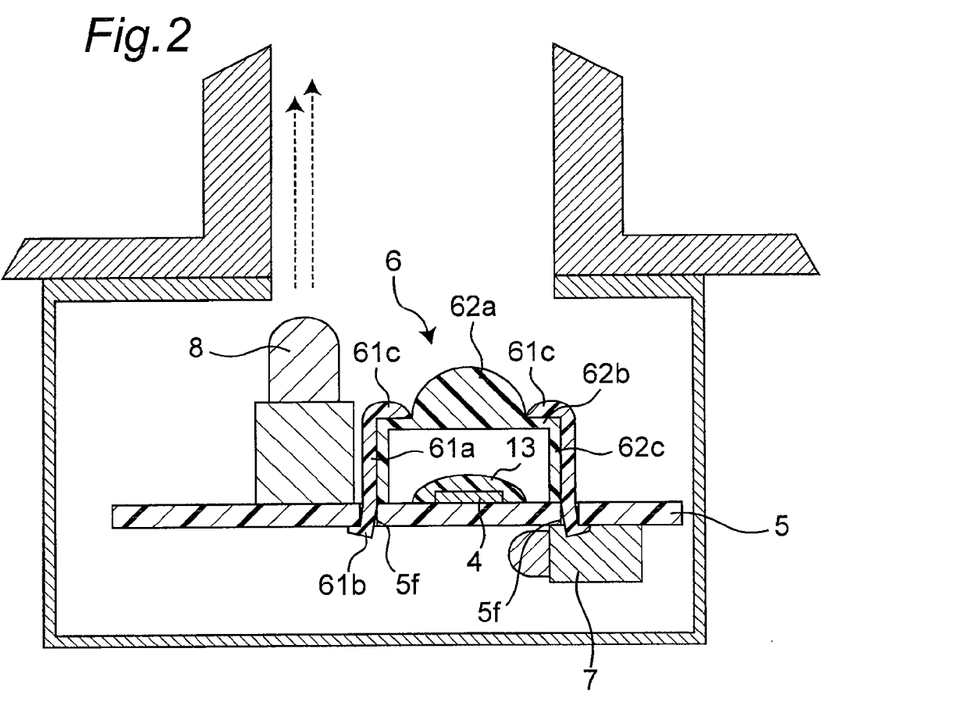
FIG. 2 is a partially enlarged cross-sectional view of the induction heating cooker shown in FIG. 1.
Figure 3:
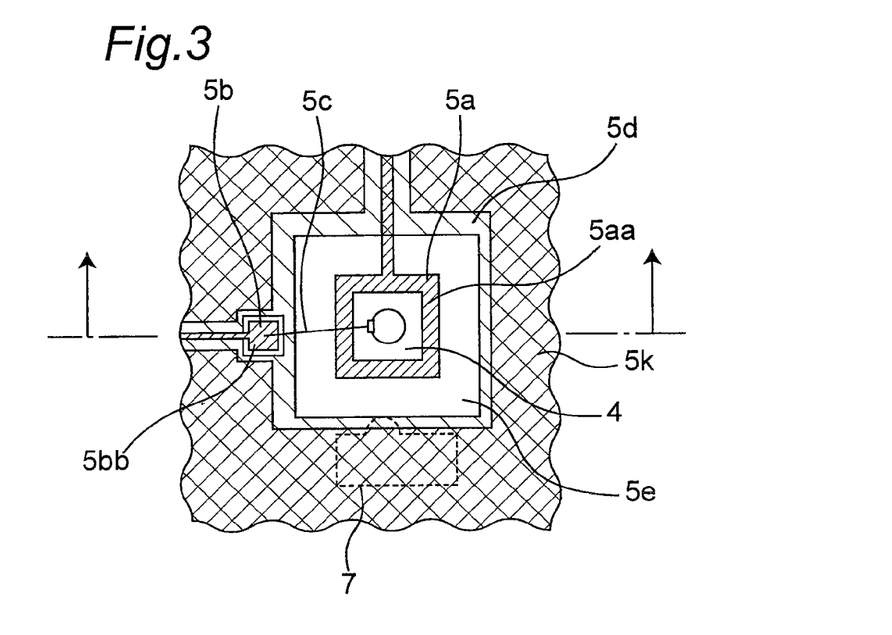
FIG. 3 is an enlarged plan view around an infrared sensor included in the induction heating cooker shown in FIG. 1.

A description will be given of the overall structure of an induction heating cooker according to a first embodiment of the present invention. FIG. 1 is a schematic configuration diagram of the induction heating cooker according to the first embodiment of the present invention. FIG. 2 is a partially enlarged cross-sectional view of the induction heating cooker shown in FIG. 1. FIG. 3 is an enlarged plan view around an infrared sensor included in the induction heating cooker shown in FIG. 1.

In FIG. 1, the induction heating cooker according to the first embodiment includes a body 1 structuring an outer casing, a top plate 2 installed at a top portion of the body 1 and on which a cooking vessel P being a heating-target object is placed, and a heating coil 3 that inductively heats the cooking vessel P.

The cooking vessel P is made of a magnetic material such as iron or magnetic stainless steel, so as to be capable of magnetically coupling with the heating coil 3. The top plate 2 is a flat-plate like member made of a nonmetallic electrically insulating material such as heat-resistant reinforced glass. The heating coil 3 is fixed to a coil base 14 made of a heat resistant resin, and is structured with an internal coil 3a and an external coil 3b which are concentrically divided into two. To the heating coil 3, an inverter circuit 10 supplying a high-frequency current is connected. When being supplied with a high-frequency current from the inverter circuit 10, the heating coil 3 generates a high-frequency magnetic field. Thus, an eddy current caused by electromagnetic induction flows inside the cooking vessel P, and the cooking vessel P is heated by Joule heat generated by the eddy current.

Below the top plate 2, an infrared sensor 4 that senses (receives) infrared radiation radiated from the cooking vessel P is provided. The infrared sensor 4 is held by a printed circuit board 5 below the heating coil 3. The infrared sensor 4 is structured with a semiconductor chip such as silicon, and indium gallium arsenide. The infrared sensor 4 senses infrared radiation radiated from the cooking vessel P and transmitting through the top plate 2, and converts the energy of the sensed infrared radiation into voltage, current, frequency, and the like to output the same. The infrared sensor 4 is disposed externally with reference to a center opening portion 3c near a center axis C1 of the heating coil 3, and is fixed on the front surface side of the printed circuit board 5 at a position where it can receive infrared radiation transmitting through the top plate 2 via a region 3d between the internal coil 3a and the external coil 3b. As shown in FIG. 2, the infrared sensor 4 is sealed by a light transmissive resin 13 so as not to be affected by moisture or the like.

On the front surface side of the printed circuit board 5, copper foil patterns 5a, 5b, and 5k, each of which are one example of a conductive foil for connecting an electrical component, are formed, and a resist film 5d for securing the insulating reliability among the copper foils is printed on the copper foil patterns 5a, 5b, and 5k. As shown in FIG. 3, the infrared sensor 4 is soldered to the copper foil pattern 5a at a portion 5aa where the resist film 5d is not formed, and is connected by a gold wire 5c to the copper foil pattern 5b at a portion 5bb where the resist film 5d is not formed. Thus, the infrared sensor 4 is electrically connected to the circuit of the printed circuit board 5. Further, also on the back surface side of the printed circuit board 5, a copper foil pattern 5h which is one example of a conductive foil for connecting an electrical component is formed, and a resist film 5i for securing the insulating reliability between the copper foils is printed on the copper foil pattern 5h. In a surrounding nearby region of the infrared sensor 4, there is formed a light transmissive portion 5e provided with none of the copper foil patterns 5a, 5b, 5k, and 5h and the resist films 5d and 5i.

On the surface of the printed circuit board 5 where the infrared sensor 4 is held (in the first embodiment, the front surface side), as shown in FIG. 2, there is mounted a filter unit 6, which is one example of a visible light cutting filter that stores therein the infrared sensor 4 to allow transmission of infrared radiation externally incident upon the infrared sensor 4 and to cut off visible light which would otherwise be externally incident upon the infrared sensor 4. The filter unit 6 covers the field of view of the infrared sensor 4 on the printed circuit board 5, with a prescribed gap kept from the infrared sensor 4. The filter unit 6 is structured by having a lens unit 62 fitted inside a light-cutting case 61 whose sidewall is substantially cylindrical. The filter unit 6 allows transmission of infrared radiation, and cuts off visible light which would otherwise be incident upon the infrared sensor 4 from the surface of the printed circuit board 5 where the infrared sensor 4 is held.

Figure 4:
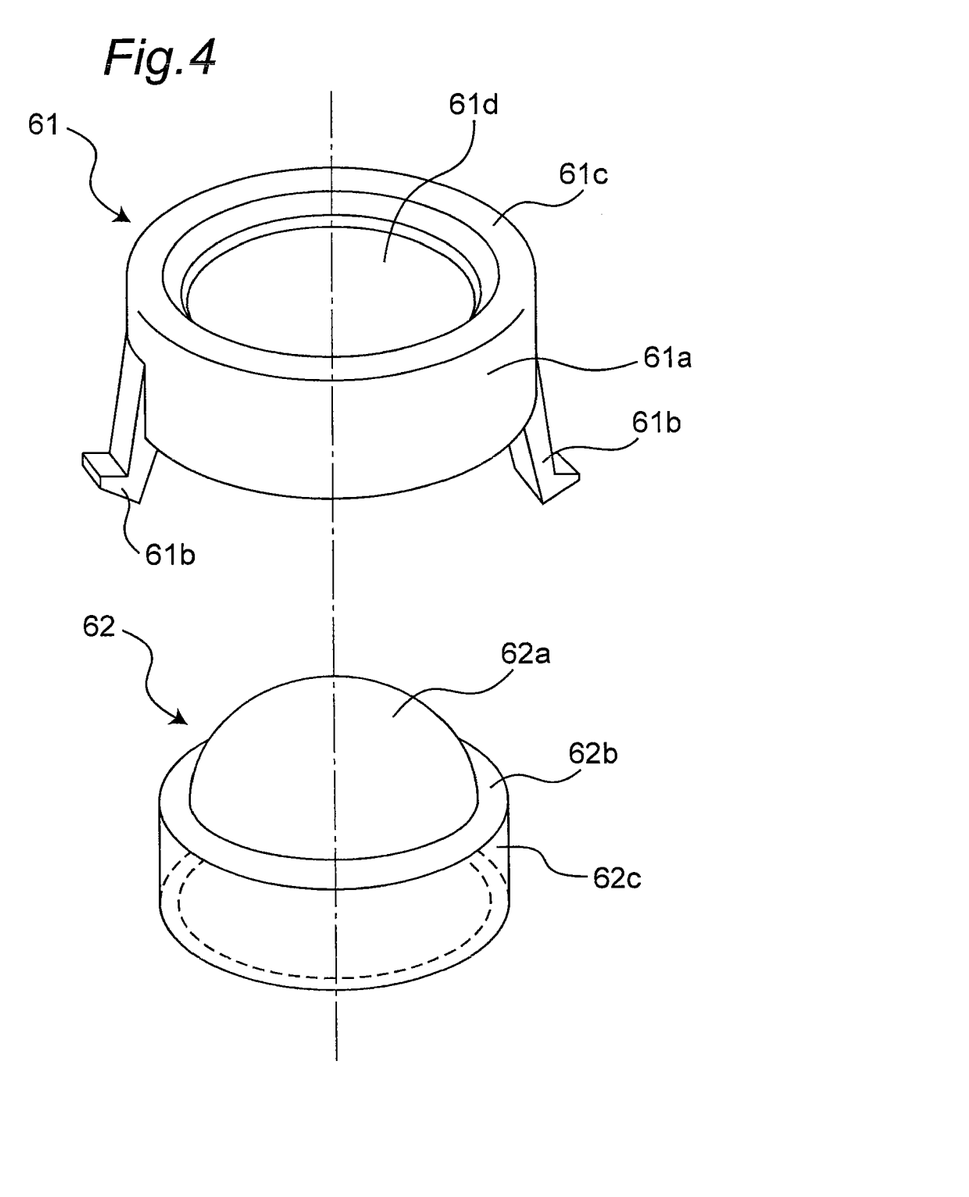
FIG. 4 is an exploded perspective view of a filter unit included in the induction heating cooker shown in FIG. 1.

FIG. 4 is an exploded perspective view of the filter unit 6. The light-cutting case 61 is structured with a cylindrical sidewall portion 61a, a plurality of engaging claws 61b projecting substantially downward from the bottom end of the sidewall portion 61a, and a ring-like flange portion 61c projecting inward from the top end of the sidewall portion 61a. The light-cutting case 61 is structured with a member which does not allow transmission of infrared radiation and visible light, or a resin possessing high light-cutting performance. The light-cutting case 61 is mounted on the printed circuit board 5 by the engaging claws 61b being inserted into through holes 5f of the printed circuit board 5 and engaged thereto.

The lens unit 62 is prepared by integrally molding a resin material possessing a filter characteristic of allowing transmission of the infrared radiation radiated from the cooking vessel P and cutting off visible light. The lens unit 62 is structured with a lens 62a, a top wall portion 62b disposed substantially parallel to the end circumference of the lens 62a, and a cylindrical sidewall portion 62c having a top end connected to the top wall portion 62b. The lens unit 62 is mounted to the light-cutting case 61 such that the lens 62a projects from a top opening 61d of the light-cutting case 61 defined by the flange portion 61c.

Further, on the surface of the printed circuit board 5 where the infrared sensor 4 is held (in the first embodiment, the front surface side), as shown in FIG. 2, a sensor position reporting-purpose light emitting portion 8 for reporting the position of the infrared sensor 4 to a user is mounted near the filter unit 6. The sensor position reporting-purpose light emitting portion 8 is structured to emit visible light toward a recognition window (not shown) provided at the top plate 2. The recognition window may overlap an incident window (not shown) for the infrared radiation received by the infrared sensor 4, or may be disposed at a position near but apart from the incident window. Thus, it becomes possible to report the position of the infrared sensor 4 to the user, to guide the user to place the cooking vessel P on the region of the top plate 2 above the infrared sensor 4.

Though it is not particularly limited, as the sensor position reporting-purpose light emitting portion 8, an LED (a light emitting diode), a light bulb, or the like can be used. It is noted that, the sensor position reporting-purpose light emitting portion 8 is just required to emit visible light. The sensor position reporting-purpose light emitting portion 8 may emit visible light in, e.g., red color, green color, or blue color.

On the surface (in the first embodiment, the back surface side) of the printed circuit board 5 opposite to the surface where the infrared sensor 4 is held, a sensor failure sensing-purpose light emitting portion 7 emitting visible light for sensing any failure of the infrared sensor 4 is soldered to be mounted thereby. The sensor failure sensing-purpose light emitting portion 7 is disposed at such a position that the visible light emitted therefrom will transmit through the printed circuit board 5 and irradiate inside the filter unit 6. The printed circuit board 5 is structured with a light transmissive member, for allowing transmission of the light from the sensor failure sensing-purpose light emitting portion 7. The infrared sensor 4 receives the light of the sensor failure sensing-purpose light emitting portion 7 radiated inside the filter unit 6.

Figure 5:
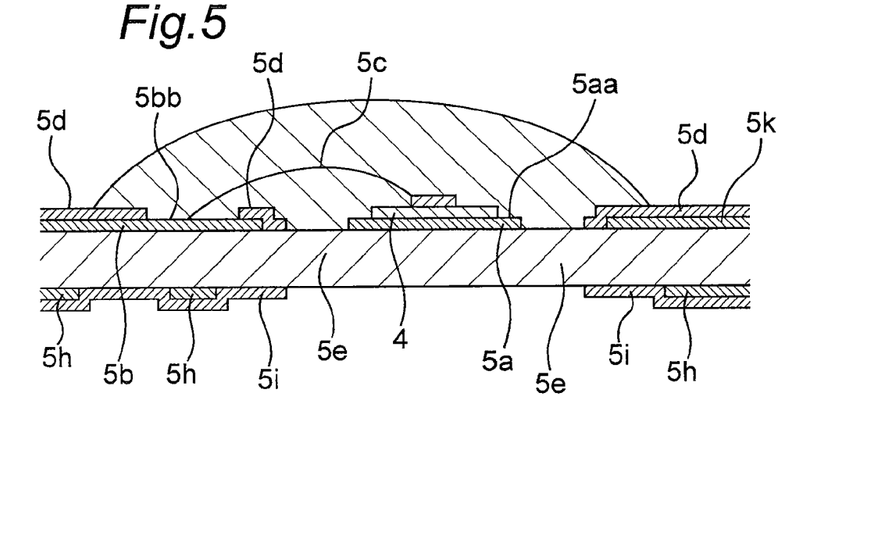
FIG. 5 is an enlarged cross-sectional view around the infrared sensor included in the induction heating cooker shown in FIG. 1.

Further, as shown in FIGS. 3 and 5, also on the back surface of the printed circuit board 5, a light transmissive portion 5e which is not provided with the resist film 5d is formed in the surrounding nearby region of the infrared sensor 4, with the printed circuit board 5 interposed therebetween, in order not to prevent transmission of the light from the sensor failure sensing-purpose light emitting portion 7.

With the structure described above, it becomes possible to increase the light amount emitted from the sensor failure sensing-purpose light emitting portion 7 and received by the infrared sensor 4, and to sense the failure of the infrared sensor 4 more accurately even when the sensor failure sensing-purpose light emitting portion 7 is at the identical light intensity. Further, the sensor failure sensing-purpose light emitting portion 7 is structured such that the light emitting portion is formed at a vertical surface with reference to the soldered surface, so as to emit light to the position where the infrared sensor 4 is disposed, in parallel to the back surface of the printed circuit board 5 as seen two-dimensionally. Thus, the sensor failure sensing-purpose light emitting portion 7 is provided on the surface of the printed circuit board 5 opposite to the surface where the infrared sensor 4 is held, so as to allow transmission of visible light through the printed circuit board 5 to irradiate inside the filter unit 6. This makes it possible to attach the sensor failure sensing-purpose light emitting portion 7 to the back surface of the printed circuit board 5 by soldering, to thereby achieve a further increase in the amount of light received by the infrared sensor 4. Further, in order to implement the printed circuit board 5 as a light transmissive member, the printed circuit board 5 may be made of glass epoxy.

As the sensor failure sensing-purpose light emitting portion 7, an LED, a light bulb, or the like can be used. Further, the light that the sensor failure sensing-purpose light emitting portion 7 emits is just required to include light in a wavelength region which the infrared sensor 4 can receive. Preferably, the light is visible light which is inexpensive as compared to those emitting infrared radiation. Further preferably, the light is visible light having a longer wavelength, which exhibits excellent light-receiving sensitivity to the infrared sensor 4, rather than the visible light having a shorter wavelength. Examples of the sensor failure sensing-purpose light emitting portion 7 include a red-color LED whose wavelength is longer than that of the blue color. This makes it possible to reduce the cost for the sensor failure sensing-purpose light emitting portion 7, and to reduce the light emission intensity. Furthermore, because the sensor failure sensing-purpose light emitting portion 7 does not double as the sensor position reporting-purpose light emitting portion 8, the emission color of the sensor position reporting-purpose light emitting portion 8 can freely be selected among those having a wavelength shorter than the red color, e.g., the blue color or the green color, which are not easily detected by the infrared sensor 4.

The control unit 11 has a failure sensing unit 9. The infrared sensor 4 and the sensor failure sensing-purpose light emitting portion 7 are connected to the control unit 11. The display operation portion 12 disposed on the top plate 2 and the infrared sensor 4 are connected to the control unit 11. The control unit 11 controls the driving operation of the inverter circuit 10, to carry out control operations such as starting heating, stopping heating, and changing the magnitude of the high-frequency current supplied to the heating coil 3. Based on the instruction of the user received at the display operation portion 12, the control unit 11 lights up the sensor failure sensing-purpose light emitting portion 7, and receives the output of the infrared sensor 4 when such lighting takes place. Based on the output information from the control unit 11 to the sensor failure sensing-purpose light emitting portion 7 and the input information from the infrared sensor 4, the failure sensing unit 9 determines that, in a situation where the sensor failure sensing-purpose light emitting portion 7 is lit up, the infrared sensor 4 is in a normal state when the output of the infrared sensor 4 is higher than a prescribed threshold value. On the other hand, the failure sensing unit 9 determines that the infrared sensor 4 is in an abnormal state when the output of the infrared sensor 4 is equal to or less than the threshold value.

As described above, because the control unit 11 includes the failure sensing unit 9, it is possible to determine whether the infrared sensor 4 is in a normal state or in an abnormal state by receiving the output of the infrared sensor 4, in a situation where the sensor failure sensing-purpose light emitting portion 7 is lit up.

When the failure sensing unit 9 determines that the infrared sensor 4 is in a normal state, the control unit 11 starts driving the inverter circuit 10. It is noted that, in this state, the cooking vessel P is disposed on the top plate 2 above the heating coil 3, and is magnetically coupled with the heating coil 3. Thereafter, the control unit 11 controls the driving operation of the inverter circuit 10 in accordance with the output of the infrared sensor 4. The control unit 11 calculates the temperature of the cooking vessel P based on the output of the infrared sensor 4, and based on the calculated temperature information of the cooking vessel P and the heating instruction information, the control unit 11 controls the driving operation of the inverter circuit 10. For example, in a case where a frying cooking mode is input to the display operation portion 12 as the heating instruction information, the control unit 11 controls the driving operation of the inverter circuit 10 such that the temperature of the cooking vessel P is maintained at a prescribed temperature.

On the other hand, when the failure sensing unit 9 determines that the infrared sensor 4 is in an abnormal state, the control unit 11 limits the output of the inverter circuit 10 (suppresses the output or stops the heating operation). Thus, it becomes possible to avoid any dangerous situation such as deformation of the cooking vessel P and damage thereto, the oil catching fire and the like, all of which would otherwise be invited by the failed infrared sensor 4 continuing heating the cooking vessel P, to excessively raise the temperature of the cooking vessel P.

As the control unit 11, a DSP (digital signal processor), a microcomputer, or the like can be used. Further, as the control unit 11, a custom IC or the like may be used.

With the induction heating cooker according to the first embodiment of the present invention, because the filter unit 6 prevents visible light from being incident upon the infrared sensor 4 from the front surface side of the printed circuit board 5, even in a situation where the induction heating cooker is used in a high luminance environment where it is exposed to ambient light which includes visible light such as sunlight, it is possible to suppress any change in the output of the infrared sensor 4 due to the ambient light.

Further, with the induction heating cooker according to the first embodiment of the present invention, because the two light emitting portions, i.e., the sensor position reporting-purpose light emitting portion 8 and the sensor failure sensing-purpose light emitting portion 7, are included, the sensor position reporting-purpose light emitting portion 8 is allowed to emit visible light in arbitrary emission color, while the sensor failure sensing-purpose light emitting portion 7 is allowed to emit visible light that can be detected by the infrared sensor 4. This allows the infrared sensor 4 to be structured so as to be capable of sensing the light from the sensor failure sensing-purpose light emitting portion 7 and the infrared radiation radiated from the cooking vessel P. Accordingly, sensing can be carried out more accurately before heating is started as compared to the conventional manner, even when the light emitting portion for detecting the abnormality of the infrared sensor 4 is at the identical light intensity.

Further, with the induction heating cooker according to the first embodiment of the present invention, thanks to the structure described above, an increase in the amount of light received by the infrared sensor 4 can easily be achieved as compared to the conventional manner. Accordingly, the necessity of increasing the light intensity of the sensor failure sensing-purpose light emitting portion 7 can be eliminated, to thereby achieve a reduction in cost and an improvement in reliability.

Still further, with the induction heating cooker according to the first embodiment of the present invention, it is not necessary for the light from the sensor position reporting-purpose light emitting portion 8 to be sensed by the infrared sensor 4. Accordingly, the color of the light from the sensor position reporting-purpose light emitting portion 8 can freely be set (e.g., the blue color that is shorter in the wavelength than the red color and therefore is not easily sensed by the infrared sensor 4). This makes it possible to achieve an improvement in terms of design.

Still further, with the induction heating cooker according to the first embodiment of the present invention, even when the sensor failure sensing-purpose light emitting portion 7 is structured to emit visible light, the infrared sensor 4 is structured to receive the light from the sensor failure sensing-purpose light emitting portion 7 which is radiated inside the filter unit 6 and is not visually recognized by the user. Accordingly, the user will not be bothered by a feeling of strangeness by visually recognizing the light from the sensor failure sensing-purpose light emitting portion 7, which is not the light from the sensor position reporting-purpose light emitting portion 8.

It is noted that the present invention is not limited to the first embodiment described above, and can be practiced in various other modes. For example, in the first embodiment, though it has been described that the cooking vessel P is made of a magnetic material, the present invention is not limited thereto. In recent years, the technique of inductively heating copper, aluminum, and the like, which are nonmagnetic and low-electrically-resistant metals, is in practical use. Accordingly, in a case where such a technique is employed to the induction heating cooker of the present invention, the cooking vessel P may be made of a metal material such as copper, aluminum, or the like.

Second Embodiment

Figure 6:
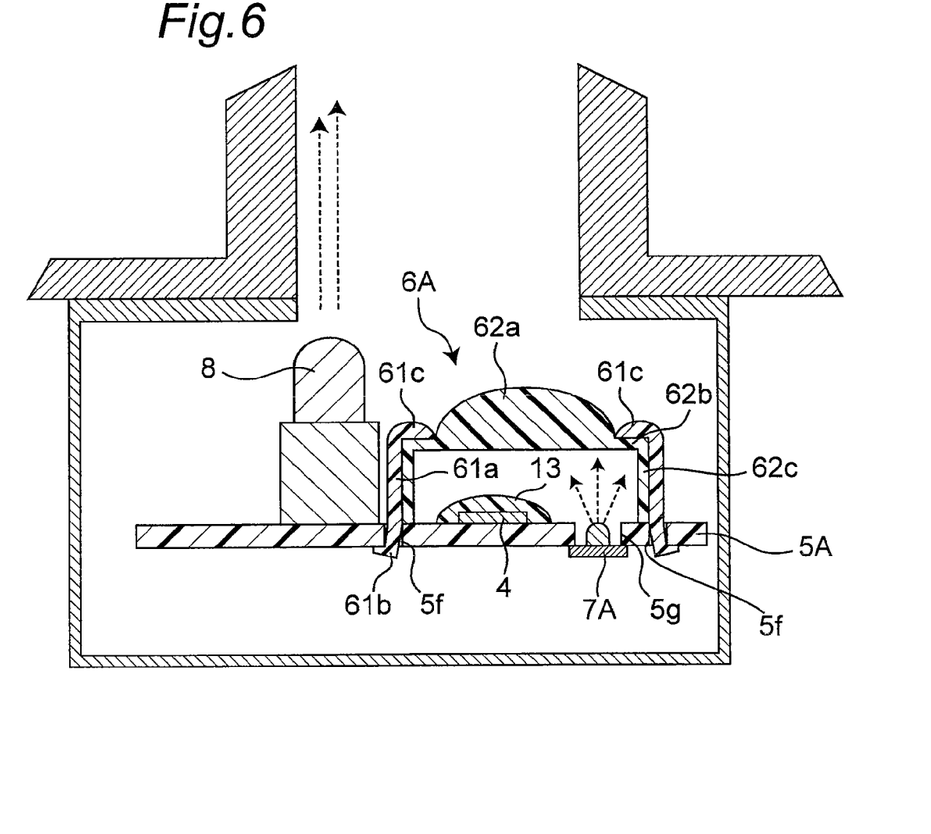
FIG. 6 is a partially enlarged cross-sectional view of an induction heating cooker according to a second embodiment of the present invention.

With reference to FIG. 6, a description will be given of an induction heating cooker according to a second embodiment of the present invention. FIG. 6 is a partial enlarged view of the induction heating cooker according to the second embodiment of the present invention. The difference in the induction heating cooker according to the second embodiment from the induction heating cooker according to the first embodiment lies in that an opening portion 5g is provided at a printed circuit board 5A, so that a sensor failure sensing-purpose light emitting portion 7A emits light to irradiate inside the filter unit 6 through the opening portion 5g. The opening portion 5g is disposed in the region of the printed circuit board 5A, near the infrared sensor 4 and covered by the filter unit 6.

With the induction heating cooker according to the second embodiment of the present invention, because the light from the sensor failure sensing-purpose light emitting portion 7A is emitted to directly irradiate inside the filter unit 6 through the opening portion 5g, it is possible to allow the light from the sensor failure sensing-purpose light emitting portion 7A to be received by the infrared sensor 4, without being affected by the optical transmittance of the printed circuit board 5 or the like. This makes it possible to achieve a further reduction in the light intensity that the sensor failure sensing-purpose light emitting portion 7A requires, as compared to the first embodiment. Further, it becomes possible to eliminate the necessity of structuring the printed circuit board 5 with a light transmissive member. For example, as the printed circuit board 5, a printed circuit board made of phenol, which is less transmissive as compared to glass epoxy, can be used.

It is noted that, in the first embodiment, the filter unit 6 can be made smaller than that of the second embodiment. Further, in the second embodiment, it is practically difficult to completely close the opening portion 5g by the sensor failure sensing-purpose light emitting portion 7A. On the other hand, the first embodiment is advantageous in being free of such a problem, because the opening portion 5g is not provided. In a case where the opening portion 5g cannot completely be closed and a gap is left, ambient light may enter from such gap.

Third Embodiment

Figure 7:
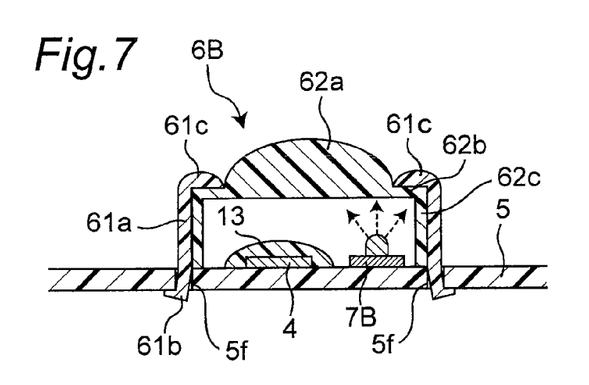
FIG. 7 is a partially enlarged cross-sectional view of an induction heating cooker according to a third embodiment of the present invention.
Figure 8:
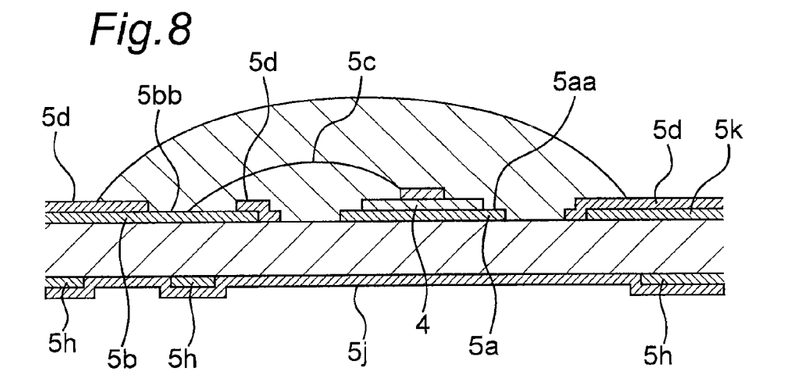
FIG. 8 is an enlarged cross-sectional view around an infrared sensor included in the induction heating cooker according to the third embodiment of the present invention.

With reference to FIGS. 7 and 8, a description will be given of an induction heating cooker according to a third embodiment of the present invention. FIG. 7 is a partial enlarged view of the induction heating cooker according to the third embodiment of the present invention. FIG. 8 is an enlarged cross-sectional view around the infrared sensor included in the induction heating cooker according to the third embodiment of the present invention. The difference in the induction heating cooker according to the third embodiment from the induction heating cooker according to the first embodiment lies in that, a sensor failure sensing-purpose light emitting portion 7B is provided in a region on the surface of the printed circuit board 5 where the infrared sensor 4 is held, the region being covered by a filter unit 6B; and a resist film 5j for securing the insulating reliability among the copper foils is provided on the back surface of the printed circuit board 5 made of glass epoxy, which is a light-transmissive material, in and around a region opposing to the infrared sensor 4 with the printed circuit board 5 interposed therebetween. Here, the resist film 5j is not removed like the resist film 5i being removed by the light transmissive portion 5e as shown in FIG. 5.

With the induction heating cooker according to the third embodiment of the present invention, because the sensor failure sensing-purpose light emitting portion 7B is disposed inside the filter unit 6B, it is possible to allow the light from the sensor failure sensing-purpose light emitting portion 7B to be received by the infrared sensor 4, without being affected by the optical transmittance of the printed circuit board 5 or the like. Further, the resist film 5j is provided on the back surface of the printed circuit board 5, which is not removed in and around the region opposing to the infrared sensor 4 with the printed circuit board 5 interposed. Therefore, even when the printed circuit board 5 is structured with a light transmissive member, it is possible to prevent ambient light from transmitting through the printed circuit board 5 from the back surface of the printed circuit board 5 and being received by the infrared sensor 4. Further, the necessity of structuring the printed circuit board 5 with a light transmissive member can be eliminated. For example, as the printed circuit board 5, a printed circuit board made of phenol, which is less transmissive as compared to glass epoxy, can be used.

Fourth Embodiment

Figure 9:
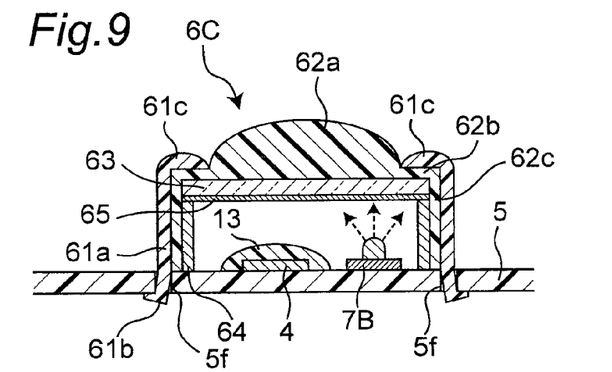
FIG. 9 is a partially enlarged cross-sectional view of an induction heating cooker according to a fourth embodiment of the present invention.

With reference to FIG. 9, a description will be given of an induction heating cooker according to a fourth embodiment of the present invention. FIG. 9 is a partial enlarged view of the induction heating cooker according to the fourth embodiment of the present invention. The difference in the induction heating cooker according to the fourth embodiment from the induction heating cooker according to the third embodiment lies in provision of a thin film at the filter unit 6C. This thin film allows transmission of infrared radiation, reinforces the visible light cutting characteristic of the filter unit 6C, and reflects off the visible light from the sensor failure sensing-purpose light emitting portion 7B being radiated inside the visible light cutting filter 6C. That is, the difference lies in that, inside the lens unit 62 of the filter unit 6C, a glass plate 63 and a supporting cylinder 64 that supports the glass plate 63 on a top end thereof are provided; and a thin film 65 is formed by depositing a metal or a dielectric on the surface of the glass plate 63. While the thin film 65 has a filter characteristic of cutting off the visible light of a particular frequency to reinforce the visible light cutting characteristic of the lens unit 62, it has a filter characteristic of allowing transmission of infrared radiation. The filter unit 6C allows transmission of the infrared radiation radiated from the bottom of the cooking vessel P at the portion of the lens unit 62 and the thin film 65.

In a case where the filter unit 6 is made of a resin material as in the first embodiment, in a situation where ambient light such as sunlight is directly incident upon the filter unit 6, the ambient light cannot fully be cut off in some cases.

In contrast thereto, with the induction heating cooker according to the fourth embodiment of the present invention, because the thin film 65 is provided, the ambient light can fully be cut off so as not to be received by the infrared sensor 4. Further, provision of the thin film 65 makes it possible to enhance the diffusion effect as to the visible light from the sensor failure sensing-purpose light emitting portion 7B inside the filter unit 6C. This achieves a further increase in the amount of light emitted from the sensor failure sensing-purpose light emitting portion 7B and received by the infrared sensor 4. Accordingly, as compared to a case where the thin film 65 is not provided, any abnormality of the infrared sensor 4 can be sensed more accurately before heating is started, and a further reduction in the light intensity of the sensor failure sensing-purpose light emitting portion 7B can be achieved.

Further, in the fourth embodiment, though it has been described that the thin film 65 is formed just on the surface of the glass plate 63, the present invention is not limited thereto. In order to enhance the diffusion effect as to the visible light reflecting inside the filter unit 6, a thin film for enhancing the reflection effect may be formed also inside the supporting cylinder 64.

Still further, in the fourth embodiment, because of the difficulty normally found in directly forming a thin film on a resin material, the glass plate 63 is provided. However, the present invention is not limited thereto. Formation of the thin film for cutting off visible light on the internal surface of the filter unit 6C will suffice.

It is to be noted that, an appropriate combination of any of the foregoing various embodiments can achieve the effects that embodiments respectively possess.

INDUSTRIAL APPLICABILITY

The induction heating cooker according to the present invention is structured to cut off visible light being incident upon the infrared sensor, and yet is capable of sensing abnormality of the infrared sensor more accurately before heating is started. Therefore, in particular, the present invention is useful for an induction heating cooker used in a high luminance environment where it is exposed to ambient light such as sunlight.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless departing therefrom.

The entire disclosure of each of Japanese Patent Application Nos. 2008-332564 and 2009-148603 filed on Dec. 26, 2008 and Jun. 23, 2009, respectively, including the specification, drawings, and claims is incorporated herein by reference in its entirety.

The invention claimed is:

1. An induction heating cooker, comprising:
 a heating coil that heats a heating-target object on a top plate;
 an inverter circuit that supplies a high-frequency current to the heating coil;
 an infrared sensor that is provided below the top plate and that senses infrared radiation radiated from the heating-target object;
 a sensor failure sensing-purpose light emitting portion that emits visible light for sensing a failure of the infrared sensor;

a control unit that controls a driving operation of the inverter circuit in accordance with an output of the infrared sensor and limits an output of the inverter circuit when the output of the infrared sensor is equal to or less than a threshold value in a situation where the sensor failure sensing-purpose light emitting portion is lit up;

a printed circuit board that holds the infrared sensor, wherein the printed circuit board includes an opening near the infrared sensor, and the sensor failure sensing-purpose light emitting portion is provided on a surface of the printed circuit board opposite a surface where the infrared sensor is held so that the visible light emitted from the sensor failure sensing-purpose light emitting portion irradiates inside the visible light cutting filter through the opening; and a visible light cutting filter that is provided on a surface of the printed circuit board where the infrared sensor is held, so as to cover a field of view of the infrared sensor, the visible light cutting filter storing therein the infrared sensor to allow transmission of the infrared radiation externally incident upon the infrared sensor and to cut off visible light externally incident upon the infrared sensor, wherein the infrared sensor receives the visible light emitted from the sensor failure sensing-purpose light emitting portion to irradiate inside the visible light cutting filter.

2. The induction heating cooker according to claim 1, wherein the visible light cutting filter is provided with a thin film that allows transmission of the infrared radiation, that reinforces a visible light cutting characteristic of the visible light cutting filter, and that reflects off the visible light from the sensor failure sensing-purpose light emitting portion radiated inside the visible light cutting filter.

3. The induction heating cooker according to claim 1, wherein a sensor position reporting-purpose light emitting portion that emits visible light to irradiate a region on the top plate sensed by the infrared sensor or a region nearby is provided near the infrared sensor.

4. The induction heating cooker according to claim 2, wherein the visible light cutting filter includes a lens that is formed with a resin and that has a filter characteristic of allowing transmission of the infrared radiation and of cutting off visible light, and a glass substrate that is disposed inside the lens and that is provided with a metal thin film or a dielectric thin film allowing transmission of the infrared radiation and cutting off visible light.

* * * * *

UNITED STATES PATENT AND TRADEMARK OFFICE
CERTIFICATE OF CORRECTION

PATENT NO. : 9,055,615 B2  
APPLICATION NO. : 13/142205  
DATED : June 9, 2015  
INVENTOR(S) : Kenji Watanabe et al.

Page 1 of 1

It is certified that error appears in the above-identified patent and that said Letters Patent is hereby corrected as shown below:

On the Title Page

Item (73) Assignee, delete "Panasonic Corporation" and insert -- Panasonic Intellectual Property Management Co., Ltd. --

Signed and Sealed this
Twenty-fourth Day of May, 2016

Michelle K. Lee
*Director of the United States Patent and Trademark Office*